US012762150B2

(12) United States Patent
Toste Gomes et al.

(10) Patent No.: US 12,762,150 B2
(45) **Date of Patent: *Oct. 13, 2026**

(54) HIGH AVAILABILITY WITH CONSENSUS IN DATABASE SYSTEMS

(71) Applicant: Singlestore, Inc., San Francisco, CA (US)

(72) Inventors: Rodrigo Toste Gomes, San Francisco, CA (US); Adrian Birka, Seattle, WA (US); Joseph Victor, San Francisco, CA (US); Tiago Vale, Lisbon (PT); Adam Prout, Toronto (CA)

(73) Assignee: SingleStore, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,829

(22) Filed: Jan. 14, 2025

(65) Prior Publication Data

US 2025/0156444 A1 May 15, 2025

Related U.S. Application Data

(63) Continuation of application No. 18/103,955, filed on Jan. 31, 2023, now Pat. No. 12,229,163.

(51) Int. Cl.
*G06F 7/00* (2006.01)
*G06F 16/21* (2019.01)
(Continued)

(52) U.S. Cl.
CPC ............ *G06F 16/278* (2019.01); *G06F 16/21* (2019.01); *G06F 16/2365* (2019.01); *G06F 16/256* (2019.01)

(58) Field of Classification Search
CPC .... G06F 16/278; G06F 16/21; G06F 16/2365; G06F 16/256; G06F 16/27
See application file for complete search history.

(56) References Cited

U.S. PATENT DOCUMENTS 5,864,851 A * 1/1999 Breitbart ............ G06F 16/2329
707/999.102
6,314,526 B1 * 11/2001 Arendt ............... H04L 67/1001
714/4.11

(Continued)

OTHER PUBLICATIONS

CNCF Operator White Paper—Review Version—Kubernetes, Jul. 15, 2021.

(Continued)

*Primary Examiner* — Mohammed R Uddin
(74) *Attorney, Agent, or Firm* — EIP US LLP

(57) ABSTRACT

A database management system configured to perform a computer-implemented method is provided. The method involves operating a database management system with two sets of nodes. The first set of nodes is responsible for maintaining system configuration data using a consensus-based replication protocol, while the second set of nodes stores user data and replicates it using a non-consensus-based protocol. The method involves configuring the first set of nodes to determine the system's state, generate and replicate system configuration data, and provide it to the second set of nodes. This includes writing an indication of a target configuration for the second set of nodes to the system configuration data. The second set of nodes then modifies its configuration according to this data. A non-transitory computer-readable storage medium comprising instructions for performing the computer-implemented method is provided.

19 Claims, 10 Drawing Sheets

(51) Int. Cl.

| | |
|---|---|
| ***G06F 16/23*** | (2019.01) |
| ***G06F 16/25*** | (2019.01) |
| ***G06F 16/27*** | (2019.01) |

(56) References Cited

U.S. PATENT DOCUMENTS

| | | | | |
|---|---|---|---|---|
| 6,453,426 | B1 * | 9/2002 | Gamache | H04L 67/1034 714/E11.133 |
| 7,149,858 | B1 * | 12/2006 | Kiselev | H04L 67/565 711/163 |
| 7,320,088 | B1 * | 1/2008 | Gawali | G06F 11/1662 709/219 |
| 9,344,493 | B1 * | 5/2016 | Anand | H04L 67/59 |
| 9,645,811 | B2 * | 5/2017 | Carlen | H04L 67/34 |
| 9,984,140 | B1 * | 5/2018 | Sukumaran | G06F 16/27 |
| 10,331,695 | B1 * | 6/2019 | Stickle | G06F 16/27 |
| 10,521,311 | B1 * | 12/2019 | Greenwood | G06F 11/1448 |
| 11,144,407 | B1 * | 10/2021 | Shankar | G06F 11/1469 |
| 11,176,172 | B2 * | 11/2021 | Gochkov | G06F 11/1662 |
| 2002/0091814 | A1 * | 7/2002 | Arendt | G06F 11/1425 719/318 |
| 2002/0194015 | A1 * | 12/2002 | Gordon | G06F 16/273 705/1.1 |
| 2007/0076593 | A1 * | 4/2007 | Sakurai | B60W 50/0205 370/219 |
| 2008/0126856 | A1 * | 5/2008 | Levidow | G06F 16/21 707/999.102 |
| 2009/0313311 | A1 * | 12/2009 | Hoffmann | G06F 11/2097 |
| 2010/0106813 | A1 * | 4/2010 | Voutilainen | G06F 9/5061 709/221 |
| 2011/0178985 | A1 * | 7/2011 | San Martin Arribas | G06F 16/278 707/E17.007 |
| 2012/0166390 | A1 * | 6/2012 | Merriman | G06F 16/2365 707/613 |
| 2013/0290249 | A1 * | 10/2013 | Merriman | G06F 16/278 707/610 |
| 2015/0278039 | A1 * | 10/2015 | Bogdanov | G06F 11/1451 714/4.11 |
| 2015/0278243 | A1 * | 10/2015 | Vincent | G06F 16/182 707/634 |
| 2015/0280959 | A1 * | 10/2015 | Vincent | H04L 67/52 709/203 |
| 2015/0379099 | A1 * | 12/2015 | Vermeulen | G06F 16/27 707/634 |
| 2016/0036924 | A1 * | 2/2016 | Koppolu | H04L 67/51 709/224 |
| 2016/0041887 | A1 * | 2/2016 | Davis | G06F 11/1612 714/6.2 |
| 2016/0085772 | A1 * | 3/2016 | Vermeulen | G06F 16/21 707/615 |
| 2016/0255016 | A1 * | 9/2016 | Miller | H04L 47/805 709/217 |
| 2016/0306719 | A1 * | 10/2016 | Laicher | G06F 11/2028 |
| 2017/0091301 | A1 * | 3/2017 | Goyal | G06F 16/2379 |
| 2017/0116095 | A1 * | 4/2017 | Schatz | G06F 11/1425 |
| 2017/0169059 | A1 * | 6/2017 | Horowitz | G06F 16/211 |
| 2017/0262519 | A1 * | 9/2017 | Horowitz | G06F 11/1458 |
| 2017/0277769 | A1 * | 9/2017 | Pasupathy | H04L 41/22 |
| 2017/0286518 | A1 * | 10/2017 | Horowitz | G06F 16/2365 |
| 2018/0096066 | A1 | 4/2018 | Venkataramanappa et al. | |
| 2020/0401602 | A1 * | 12/2020 | Helt | G06F 11/2082 |
| 2021/0073089 | A1 * | 3/2021 | Sathavalli | G06F 9/45558 |
| 2021/0089376 | A1 * | 3/2021 | Glade | G06F 11/1448 |
| 2023/0145054 | A1 * | 5/2023 | VanBenschoten | G06F 16/2379 707/620 |
| 2024/0256572 | A1 * | 8/2024 | Toste Gomes | G06F 16/27 |
| 2025/0378436 | A1 * | 12/2025 | Lochrane | G06Q 20/367 |

OTHER PUBLICATIONS

Mike Burrows: The Chubby lock service for loosely-coupled distributed systems, Google Inc., Nov. 6, 2006.

Hunt et al: ZooKeeper: Wait-free coordination for Internet-scale systems, Jun. 2010.

Florian Schintke et al: "Modeling Replica Availability in Large Data Grids", Journal of Grid Computing, Kluwer Academic Publishers, DO, vol. 1, No. 2, Jun. 1, 2003 ,pp. 219-227, XP019243464,ISSN: 1572-9184, DOI:10.1023/B:GRID.0000024086.50333.0D the whole document.

International Search Report and Written Opinion dated May 15, 2024 for PCT Application No. PCT/US2024/013179.

* cited by examiner

HIGH AVAILABILITY WITH CONSENSUS IN DATABASE SYSTEMS

CROSS-REFERENCE TO RELATED APPLICATIONS

This application is a continuation under 35 U.S.C. § 120 of U.S. application Ser. No. 18/103,955, filed Jan. 31, 2023. The above-referenced patent application is incorporated by reference in its entirety.

BACKGROUND OF THE INVENTION

Field of the Invention

The present disclosure relates to database management systems, and more specifically, methods and systems for managing the availability of data in database management systems.

Description of the Related Technology

As technologies advance, the amount of information stored in electronic form, the desire for real-time, or pseudo real-time access to the information, the ability to search, organize, and/or manipulate such information is ever increasing. Database management systems, sometimes also referred to as database systems, databases, datastores, and data warehouses, organize data in a form that facilitates efficient search, retrieval, and/or manipulation of selected information. Typical database management systems allow a user to submit a “query” or call one or more functions in a query language for searching, organizing, retrieving, and/or manipulating information that satisfies particular conditions.

Certain databases may be transactional, which is to say their primary purpose is to record transactions. Such transactions may be thought of as one or more operations performed on data, which are recorded in logs. A log may comprise a continuous stream of log records, each of which corresponds to a transaction. This may allow transactions to be replayed or undone following an event such as a system crash. Certain databases may additionally, or alternatively, be analytical, which is to say their purpose is to execute queries and generate analytics on data stored in the database.

Demands on database systems may vary. To address increased demand, database systems may be scaled up (and down) by increasing (and decreasing) the resources of an existing server by increasing (or decreasing) the memory or upgrading the CPUs. Scale-out database systems increase the capacity by adding new nodes, for example in the form of new machines, or additional resources, to the database system.

The introduction of new machines to a database system, and/or preserving data consistency across the database system when machines fail, present a number of technical challenges.

SUMMARY

According to a first aspect of the present disclosure there is provided a computer-implemented method for operating a database management system, the method comprising: configuring a first set of nodes of the database management system to: determine an instantaneous state of the database management system; generate system configuration data representative of a target configuration of the database management system based on the instantaneous state; and provide the system configuration data to a second set of nodes of the database management system, wherein the system configuration data is replicated amongst the first set of nodes according to a consensus-based replication protocol so as to maintain the system configuration data; and configuring the second set of nodes to: receive the system configuration data from the first set of nodes; and implement a state machine that is arranged to modify a configuration of the second set of nodes according to the system configuration data, wherein the second set of nodes are arranged to replicate user data according to a non-consensus-based replication protocol.

The computer-implemented method of the present disclosure aims to produce a database system that provides high availability of user data across the database system, such that in the event of a node failure, or other error in the database system, user operations can continue without significant down time. The method may utilize robust, and intensive, backup procedures for managing the configuration of the database system, and while using less robust, but faster and more agile procedures, for managing the backup operations used to maintain user data. In particular, highly durable consensus-based replication protocols are used to backup, and in some cases produce, configuration data for managing the database system. Non-consensus-based replication protocols, which typically require external coordination in the event of a node failure but are faster and more efficient than consensus-based protocols, are used when performing operations on, and storing, user data in the database system. The state machine may be used to implement changes which are to be made to the database system configuration based on the configuration data. Using a state machine in this way ensures that processes for modifying the configuration of the database system can be handled in parallel with, and without significantly interrupting or obstructing, the operations performed on user data. Additionally, the use of consensus-based replication for system configuration data allows for the implementation of faster, though less durable, asynchronous replication protocols to be used for processing user data without risking significant losses in data and transactions in the event of a node failure.

According to a second aspect of the present disclosure there is provided a database management system comprising at least one processor, and at least one memory, the memory including computer-executable instructions that, when executed by the at least one processor, cause the processor to: configure a first set of nodes of the database management system to: determine an instantaneous state of the database management system; generate system configuration data representative of a target configuration of the database management system based on the instantaneous state; and provide the system configuration data to a second set of nodes of the database management system, wherein the system configuration data is replicated amongst the first set of nodes according to a consensus-based replication protocol so as to maintain the system configuration data; and configure the second set of nodes to: receive the system configuration data from the first set of nodes; and implement a state machine that is arranged to modify a configuration of the second set of nodes according to the system configuration data, wherein the second set of nodes are arranged to replicate user data according to a non-consensus-based replication protocol.

According to a third aspect there is provided a non-transitory computer-readable storage medium comprising computer-executable instructions that, when executed by at least one processor, cause the at least one processor to:

configure a first set of nodes of the database management system to: determine an instantaneous state of the database management system; generate system configuration data representative of a target configuration of the database management system based on the instantaneous state; and provide the system configuration data to a second set of nodes of the database management system, wherein the system configuration data is replicated amongst the first set of nodes according to a consensus-based replication protocol so as to maintain the system configuration data; and configure the second set of nodes to: receive the system configuration data from the first set of nodes; and implement a state machine that is arranged to modify a configuration of the second set of nodes according to the system configuration data, wherein the second set of nodes are arranged to replicate user data according to a non-consensus-based replication protocol.

DETAILED DESCRIPTION OF CERTAIN INVENTIVE EMBODIMENTS

Figure 1:
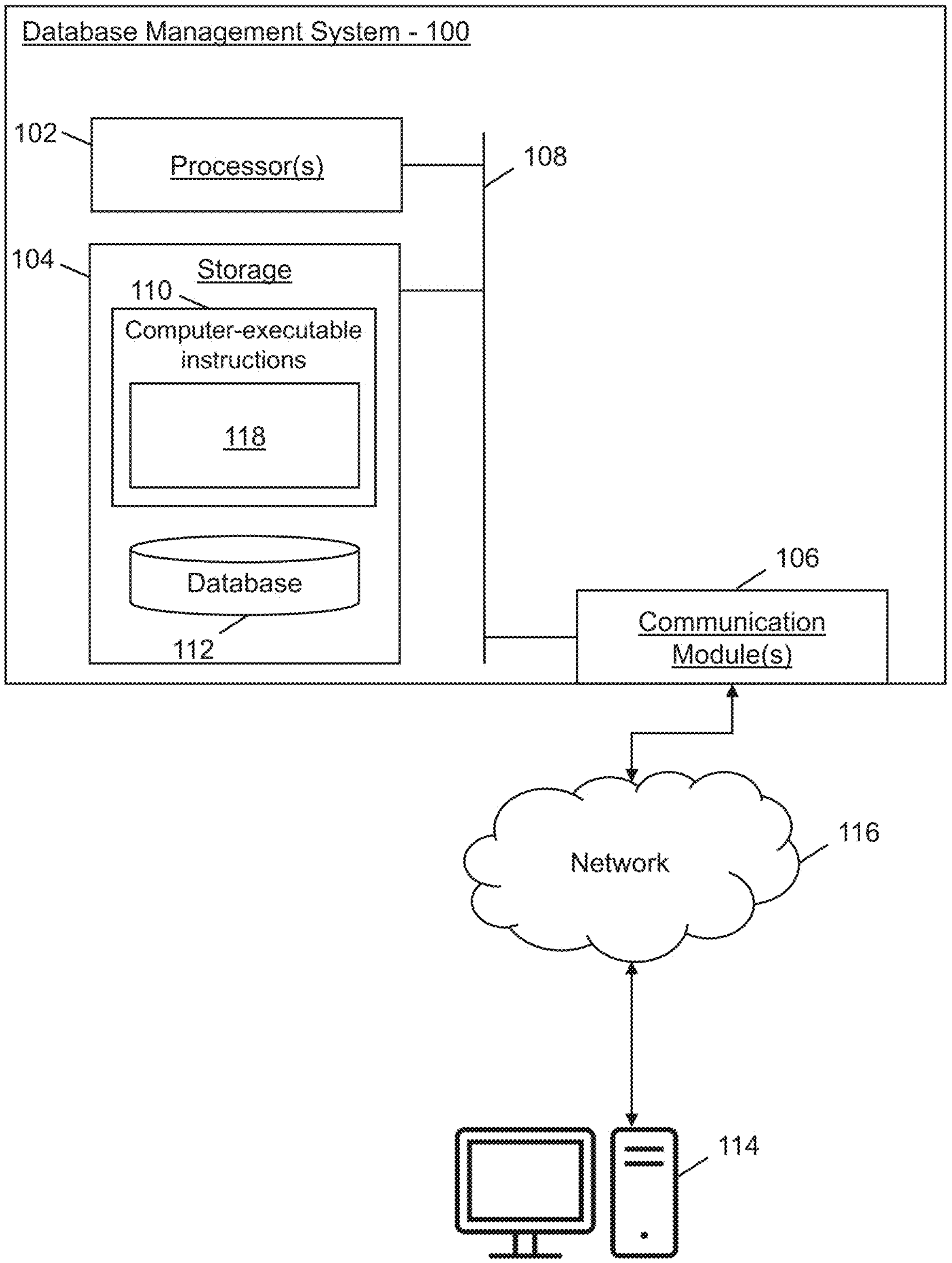
FIG. 1 is a schematic diagram showing a database system implementing an instance of a database according to examples.

Description of systems and methods according to examples will become apparent from the following description, with reference to the Figures. This description includes numerous specific details of certain examples for the purpose of explanation. Reference in the specification to "an example" or similar language means that a particular feature, structure, or characteristics described in connection with the example is included in at least that one example, but not necessarily other examples. It should be further noted that certain examples are described schematically with certain features omitted and/or necessarily simplified for case of explanation and understanding of the concepts underlying the examples.

A database may generally be considered as an organized collection of data stored electronically in a computer system. The computer systems which store and manage databases and the data stored therein are commonly referred to as database management systems, or database systems. As well as storing databases, database systems may also be configured to perform certain management functions such as replicating the databases to provide resiliency to crashes and performing operations to record new data in the database and/or to modify data already stored in the database. Some database systems may also provide an interface to enable users to implement workloads which are configured to perform operations on data stored in the database.

There are certain qualities that are generally desirable in database systems such as durability and high availability. Durability refers to a property of database systems that ensures that transactions, and user data, are saved permanently and do not accidentally get deleted or erased even in the event of a typical hardware failure, or database crash. High availability refers to a property of database systems in which uptime, or availability of the database, is higher than considered normal. Hardware failures can happen in database systems, and typically lead to some down time in which the database, or at least some portions of user data stored thereon, are not accessible. During the down time, the database system may be reconfiguring, restoring backups, replaying transactions, and so forth. Extended down time in a database system can lead to significant issues for users who rely on the database, particularly in time sensitive and/or high demand applications. The durability and high availability of a database system may be dependent on the way it is configured to process, backup, and restore user data.

High availability can be achieved by implementing a distributed database system architecture in which the database system is spread across multiple nodes. The nodes can be physical or virtual machines, that together form a single logical database system. Each node in a distributed database system stores a portion of data, and the nodes work together to manage and process the data. By distributing the data across multiple nodes, if one node goes down, the other nodes can continue to function, allowing for a high level of fault tolerance. Storing different portions of data on different nodes is typically referred to as partitioning or implementing a partitioned database. Storing copies of the same data on multiple nodes is typically referred to as implementing a replicated database. A combination of these database architectures can be used in a hybrid database system in which the data is partitioned, and copies of the partitions are stored on multiple different nodes. By storing replicas of the data on different nodes it is possible to ensure that if one node is to fail, the database system can move any active workloads or queries to one or more other nodes that have a copy of the data that was stored on the node which failed. Being able to quickly switch to a different node without any significant down time provides high availability in the database system.

Configuring a distributed database system that provides high availability is significantly more complex than configuring a single-node database, due to the need to track the location and dependency of data, ensure that the backups are up-to-date, and in some cases to distribute workloads to the nodes in which the relevant data is stored. There are a number of technical challenges to overcome to make the database system sufficiently fault tolerant and durable so that it can provide high availability. In particular, barriers to ensuring that replicas of the data stored in the database are up-to-date can include network partitions in the database system that block different parts of the database system from seeing the latest changes to data. Other barriers include nodes being added or removed from the database system, and nodes failing, and subsequently rejoining, the database system. When nodes are added, fail, and/or rejoin, it can be complex to determine what data the nodes should or should not have copies of, and, in the case of rejoining, determining how up-to-date the node was before it failed and which data is missing from the node.

As briefly described above, replicated databases store multiple copies of data on different nodes, such that if a node fails, a different node can take its place. Different processes for replication are possible and certain properties of the database will depend on the specific processes used. For example, some replication procedures are performed asynchronously with transactions. Meaning that a first node can perform and commit transactions before the associated data is replicated to a second, backup, node. This allows the users to instruct and perform operations quickly but can make the process of recovering data after a failover of the first node more difficult, as the second node may not have an up-to-date copy of all of the user's data.

Other replication procedures, such as synchronous replication procedures or consensus-based replication procedures, may be more robust, but generally come at a cost of slowing down operations that users instruct the database system to perform. Consensus-based replication procedures involve methods that aim to ensure that the copies of a shared resource, in this case user data, can be maintained consistently, and with no loss in transactions, provided that at least a majority of the system resources remain online. This is typically performed by using a group of nodes (or replicas of the database) that work together to agree on the current state of the shared resource. The process of agreeing to the current state of the shared resource amongst the group of nodes may use any of a number of suitable algorithms, such as Paxos, or Raft algorithms.

As agreement between the nodes copying the data must be reached in consensus-based protocols, the process of recording and performing new transactions may be slowed down. This is because, in at least some cases, consensus about the current state of the resource must be reached before a change to that resource, for example, as the result of an operation or transaction, can take place. Where more than one node needs to receive and process a transaction before it can be finalized, there can be delays in input and output (I/O) and in processing the transaction. Synchronous replication procedures may also be subject to similar performance constraints as transactions cannot be committed until they have been replicated to the replicas.

Consensus-based replication protocols typically require a larger amount of computing resources to achieve a similar level of durability as compared to synchronous non-consensus-based replication protocols, making consensus-based replication more expensive. For example, to achieve resiliency to one node failure, a synchronous non-consensus-based replication protocol requires two replicas, whereas consensus-based replication protocols require three replicas meaning a 50% increase in resource requirements. In general, to provide resiliency to N node failures, synchronous non-consensus-based replication protocols require N+1 replicas, whereas consensus-based replication protocols may require 2N+1 replicas. Though synchronous replication protocols typically require external coordination to manage failover events, whereas consensus-based replication protocols may include procedures for managing failovers without the need for external coordination.

Certain examples described herein provide systems and methods for operating a database management system that aim to manage the configuration of a database system to provide high availability while also maintaining fast and efficient procedures for performing operations on user data. This is done by ensuring that data in the database system is replicated efficiently, and changes to the configuration of the database are implemented quickly to ensure that, in the event of a failure of any given node, the database system can quickly swap to one or more backup nodes and thereby minimize down time. The use of a combination of durable and highly available, but computationally expensive and slower, procedures are used in some parts of the database system, while less available, but computationally cheaper and faster procedures are used in parts of the database system where they are more beneficial.

FIG. 1 shows a database management system 100 that comprises a set of one or more processors 102, storage 104, and one or more communications modules 106. The processor(s) 102, storage 102, and communication module(s) 106 are connected over an interface 108, for example, a bus. The processor(s) 102 includes any suitable combination or processing circuitry which is configurable to perform the functions described herein with reference to FIGS. 2 to 9. For example, the processor(s) 102 may include central processing units (CPUs), graphics processing units (GPUs), neural processing units (NPUs), field programmable gate arrays (FPGAs), application specific integrated circuits (ASICs), fixed function processing circuitry, any other suitable processing circuitry, and/or any combination of these.

The storage 104 may include a combination of volatile storage, or memory, and non-volatile storage, which may be referred to as disk storage. The volatile storage may include a combination of random-access memory (RAM), static random-access memory (SRAM), and/or types of dynamic random-access memory (DRAM). While the volatile storage has been described in relation to the storage 104 in some cases, part or all of the volatile storage may be directly attached to or integrated with the processor(s) 102.

Non-volatile storage, while sometimes being referred to as a "disk" or "disk storage", may include any suitable combination of non-volatile storage types. For example, the non-volatile storage may include hard disk drives, solid state drives, flash memory, magnetic tape storage, or any combination of these storage types. In some cases, the non-volatile storage may include hierarchical storage, in which different storage types are used to store data according to a respective age and/or frequency of access of the data. For example, solid state drives may be used to store data that is frequently accessed, or which is likely to be accessed frequently. While hard disk drives, or tape storage, which have a higher read/write latency than solid state drives or flash memory may be used to store data which is older or less likely to be accessed frequently.

The storage 104 is used to store computer executable instructions 110, and a database 112. The computer-executable instructions 110, when executed by the processor(s) 102 may implement one or more programs. These programs may include general database management programs for maintaining data in the database 112, performing backup and replication processes, providing an interface to the database 112, and so forth. The computer-executable instructions 110 may also include instructions for implementing user defined workloads. The database 112 included in the storage 104 may include a collection of structured data in the form of a combination of row store format and column store format data, as well as collections of unstructured data such as binary large objects.

The communications module(s) 106 may include any suitable combination of network enabled communications modules and/or user interfaces. For example, the communications module(s) 106 may include network interfaces to enable the database system 100 to communicate with one or more further computer systems 114 over a network 116 such as a local area network, a wide area network such as the internet, and so forth. The communications module(s) 106 may alternatively, or additionally, include user interfaces such as input and output devices such as screens, keyboards, touch screens and so forth. The database system 100 may be operated and/or configured based on instructions received from the one or more further computer systems 114 over the network 116.

While the database system 100 is shown in FIG. 1 as being a single device, it will be appreciated that the database system 100 may comprise a collection of separate computing systems. For example, the database system 100 may be implemented on one or more collocated servers, or cluster computers. Alternatively, the database system 100 may be a distributed database system being implemented as a plurality of computers, or servers, located remotely from one another and communicatively coupled over a network.

Figure 2:
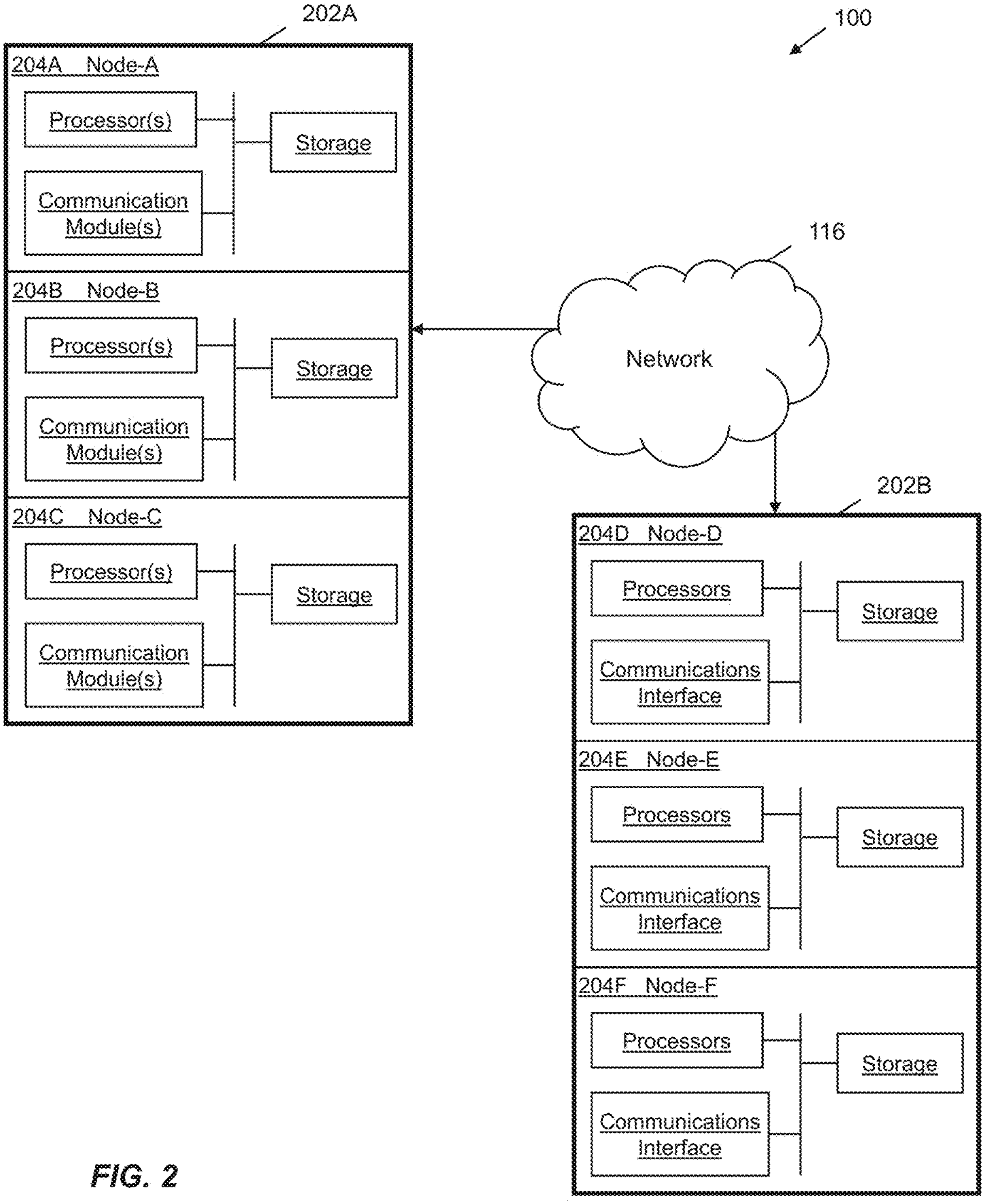
FIG. 2 is a schematic diagram showing a database system implementing an instance of a database according to examples in which the database system is a distributed database system.

Turning briefly to FIG. 2 an example of an arrangement in which the database system 100 is a distributed database system is shown. The database system 100, in this example, includes two server computers 202A and 202B connected over the network 116. The two servers 202A and 202B each comprise a respective set of computing resources that are separated into different nodes 204A to 204F. Each node is allocated its own set of one or more processors, storage, and communication modules for communicating with the other nodes in the database system 100. Distributed database systems such as that shown in FIG. 2 may be capable of adding, or "spinning up" new nodes either by adding new resources, such as a new server or allocating new resources in an existing server, or by reconfiguring existing resources.

Returning briefly again to FIG. 1 the computer-executable instructions 110 include a set of computer-executable instructions 118 which, when executed by the processor(s) 102 cause the database system 100 to perform a computer-implemented method 300 for operating a database management system 100 shown in FIG. 3 and which will be described further below in relation to FIGS. 3 to 9.

Figure 3:
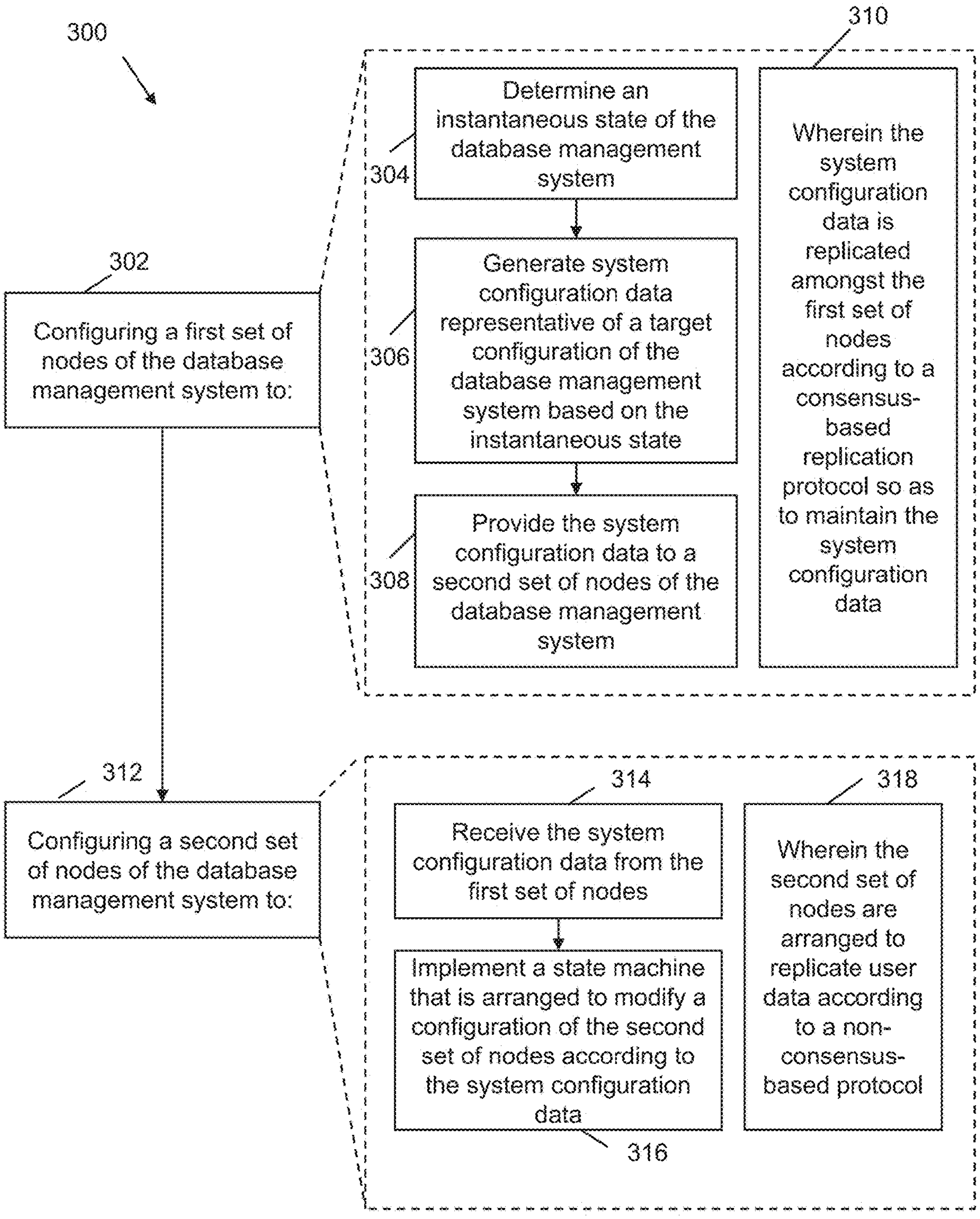
FIG. 3 is a flow chart showing a method according to examples.
Figure 4:
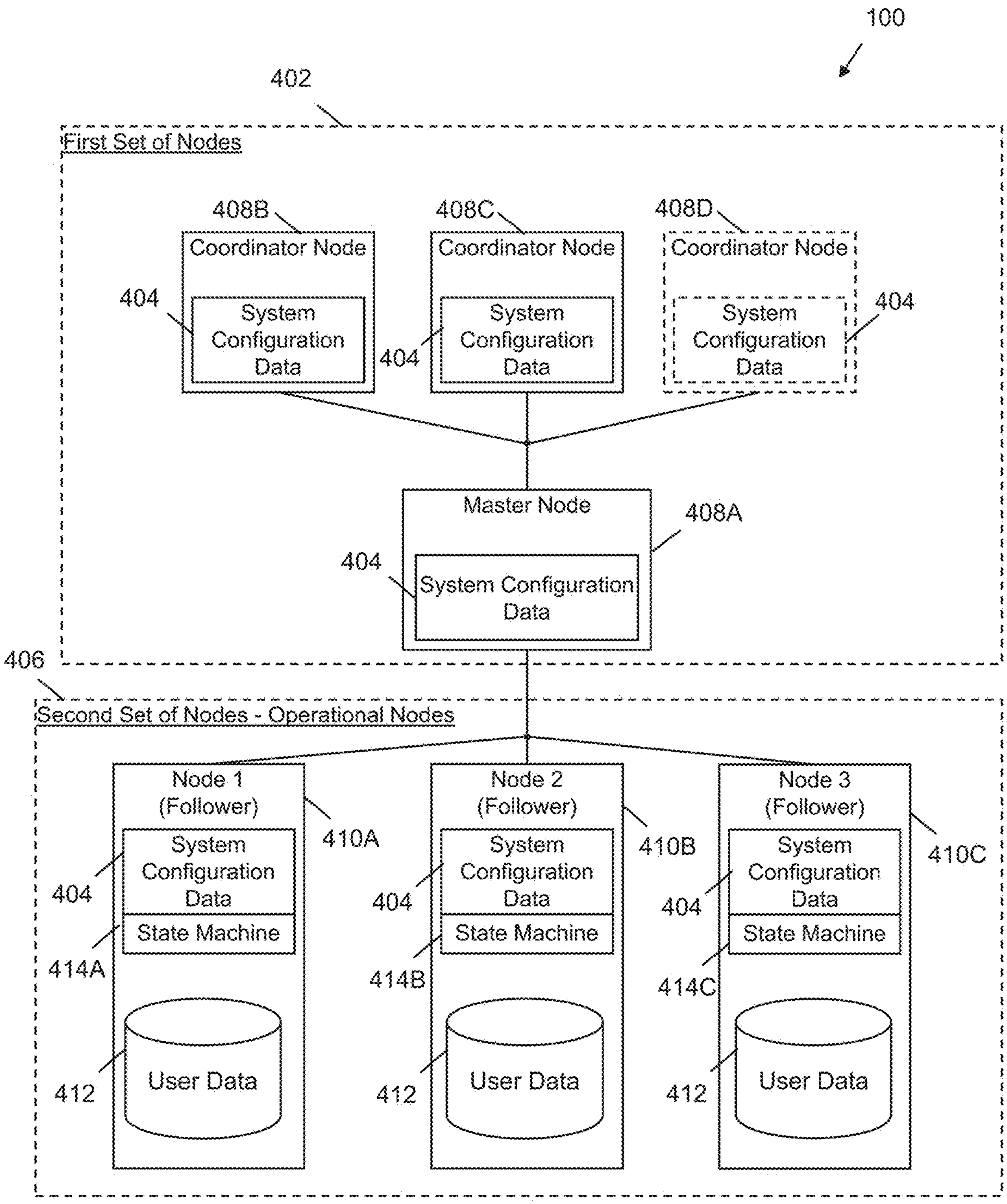
FIG. 4 is a schematic diagram showing a database system comprising a first set of nodes and second set of nodes according to examples.

Referring to FIG. 3 and FIG. 4, the method 300 comprises configuring a first set of nodes 402 of the database management system 100 to determine 304 an instantaneous state of the database management system 100, generate 306 system configuration data 404, and provide 308 the system configuration data 404 to a second set of nodes 406 of the database management system 100. In the example shown in FIG. 4 there are four nodes 408A to 408D in the first set of nodes 402, including a master node 408A and three coordinator nodes 408B to 408D. It will be appreciated that this number is given as an example and the first set of nodes 402 may have more or fewer nodes than four. In some examples, not shown, the first set of nodes 402 includes a minimum of three nodes 408A to 408D, including one master node 408A and two coordinator nodes 408B and 408C. The first set of nodes 402 may be responsible for managing the configuration and operation of the second set of nodes 406 which may be configured to process user data. The second set of nodes 406 are also referred to herein as operational nodes 406.

The operational nodes 406, shown in FIG. 4 as including three nodes 410A to 410C, are configured to store and process user data 412. The operational nodes 406 may, for instance, be configured to receive transaction requests, and perform operations on the user data 412 according to these requests. Performing operations according to these transaction requests may include reading, writing, or otherwise modifying the user data 412. In some cases, a workload, or program, is run on the database system 100 that causes the operational nodes 406 to perform a number of operations, or transactions, on the user data 412. The user data 412 may include data which a user has uploaded to, or otherwise stored on, the database system 100 to be organized and/or for performing transactions. Additionally, the user data 412 may include data generated as a result of operations or transactions performed by the operational nodes 406.

The operational nodes 406 may be arranged according to a hierarchy, or data dependency, in which one node 410A controls a primary replica of the user data 412 and a second node 410B controls a secondary replica of the user data 412. The second node 410B in this case is configured to replicate the user data 412 from the primary replica, including any modifications or changes made on the primary replica of the user data 412, stored on the first node 410A. Designating a primary and secondary replica of the user data 412 ensures data consistency across the database system 100, thereby preventing transaction or data conflicts. Generally, operations (otherwise known as transactions) are performed on the primary replica of user data 412 and replicated to the secondary replicas.

The system configuration data 404 is replicated 310 amongst the first set of nodes 402 according to a consensus-based replication protocol so as to maintain the system configuration data 404. As mentioned above, consensus-based replication protocols are a category of replication protocol which rely on agreement between a group of nodes to ensure data consistency and can improve the durability, consistency, and high availability of the system configuration data 404.

For example, consensus-based replication protocols may ensure that a majority of the first set of nodes 402 have an up-to-date copy of the system configuration data 404 such that in the event of a failover of any one of the first set of nodes 408A to 408D, including the master node 408A, the most up-to-date copy of the system configuration data 404 is not lost.

If non-consensus-based replication protocols were used to replicate the system configuration data 404 amongst the first set of nodes 402, then different parts of the database system 100 might store different versions of the system configuration data 404. In the event of a failure, it would then be difficult to determine which version of the system configuration data 404 is correct and hence how to recover any failed nodes 410A to 410C. Specific examples of consensus-based replication protocols will be described further below with respect to FIG. 5.

The system configuration data 404 is representative of a target configuration of the database management system 100 based on the instantaneous state. For example, the system configuration data 404 may specify where primary and secondary copies of user data 412 are to be stored in the database system 100, what the roles of certain operational nodes 410A to 410C are, and other relevant database lists. This may include specifying on which nodes 410A to 410C the primary and secondary replicas are to be stored, with the aim of ensuring that the user data is consistent, durably stored and highly available in the event of a failover of any one or more nodes 410A to 410C. The target location of primary and secondary copies of the user data 412, as specified in the system configuration data 404, may differ to a current location of primary and secondary copies of the user data according to the instantaneous state.

Determining the instantaneous state of the database system 100 may include monitoring the states of one or more nodes in the database system 100 and/or the state of data stored thereon. For example, the first set of nodes 402 may monitor the operational nodes 406 to determine which of the nodes 401A to 410C are in communication with the other nodes (or are "online"), whether any of the nodes 410A to 410C have dropped out of communication with the other nodes (or are "offline"), whether any of the nodes 410A to 410C have run into a data error during a transaction, and/or whether the secondary replicas of the user data 412 are up-to-date and/or replicating sufficiently quickly to ensure high availability.

Monitoring the states of the operational nodes 406 may include periodically, or continuously, communicating with the operational nodes 406 to request a status update. The operational nodes 406 may each store one or more variables indicative of their respective state. In this case, monitoring the operational nodes 406 may include receiving an indication of the one or more variables. The first set of nodes 402 may receive state information from one or more of the operational nodes 406, the state information including an indication of any one or more of: which of the second set of nodes includes the primary replica of user data; which of the second set of nodes 406 includes the secondary replica of the user data; a synchronization state of the node(s) that store the secondary replica of the user data 412; and which of the second set of nodes 406 are currently in communication with at least one other node of the second set of nodes 406.

Determining this state information allows the first set of nodes 402 to identify where user data 412 is stored, which of the second set of nodes 406 should be replicating the user data 412 from the other nodes, and whether any of the second set of nodes 406 have crashed or failed to communicate with the other of the second set of nodes 406. Where one of the second set of nodes 406 is no longer in communication with any of the other of the second set of nodes 406 it may need to be recovered so that it can continue replicating to and/or from the others of the second set of nodes 406.

The operational nodes 406 may additionally or alternatively be configured to communicate state information to the first set of nodes 402 triggered by a state change. Configuring the operational nodes 406 to proactively communicate state information makes the system 100 able to react more quickly to problems, such as failures in replication or loss of synchronization. In the event of a secondary replica failing to acknowledge transactions in a synchronous replication, it may be undesirable for the primary replica to be committing transactions until the secondary replica is marked as asynchronous by the first set of nodes 402. Otherwise, if a failover is triggered before the first set of nodes 402 are aware of the missing data on the secondary replica, there could be data loss. Hence, quickly identifying and reacting to changes in state can mitigate the risk of data loss in these circumstances. The responsibility of monitoring the database system 100 to determine an instantaneous state may be with the master node 408A. Configuring only one of the first set of nodes 402 to determine the instantaneous state of the database may eliminate the likelihood of disagreement between the first set of nodes 402 regarding the state of the database system 100 which may otherwise occur, for example, due to communication delays or errors.

As the instantaneous state of the database system 100 evolves, this state can be communicated at different speeds to different ones of the first set of nodes 402 and hence coordinating between the first nodes 402 in this respect may be unnecessary. Where the master node 408A is responsible for determining an instantaneous state of the database system 100, the master node 408A may have a communication state with the second set of nodes 406. The master node 408A may determine, or detect, changes in the communication state with the second set of nodes 406, in order to determine the instantaneous state of the database system 100. For example, the communication state may specify which of the second set of nodes 410A to 410C are in communication with the master node 408A. A change to the communication state may include the loss of communication with one or more of the second set of nodes 406, a change in the latency of communication with one or more of the second set of nodes 402, or some other change that affects communication between the master node 408A and the operational nodes 410A to 410C. The master node 408A may implement a heartbeat protocol with the second set of nodes 406. For example, according to the protocol, should one of the second set of nodes 406 (e.g., node 410B) fail to send a signal within a predetermined interval to the master node 408A, the master node 408A may determine that this node 410B has fallen out of communication with the master node 408A.

The second set of nodes 406, otherwise referred to as operational nodes, are configured 312 to receive the system configuration data 404 from the first set of nodes 402, and to implement 316 one or more state machines 414A to 414C that are arranged to modify a configuration of the second set of nodes 406 according to the system configuration data 404. The first set of nodes 402 may provide the system configuration data 404 to the second set of nodes 406 by transmitting it either over a network 112 or a bus 108, depending on the architecture of the system 100. In some cases, the system configuration 404 may be provided to the second set of nodes 406 according to a replication protocol, though generally this would be a non-consensus-based replication protocol.

In the example shown in FIG. 4 each of the second set of nodes 410A to 410C implements a respective state machine 414A to 414C, though it will be appreciated that a state machine may be shared across two or more of the second set of nodes 406. By implementing state machines 414A to 414C in this way, the second set of nodes 406 are able to take actions to place the database system 100 into a configuration according to the system configuration data 404. By instructing each of the second set of nodes 406 to take actions locally to modify the configuration of the database system 100, the system 100 becomes more responsive to failures and instantaneous state changes. Where local failures occur in the second set of nodes 406, if the failure is recoverable, the relevant node of the second set of nodes 406 can return back to the globally configured state, according to the system configuration data 404, without involving the other nodes. This in turn reduces the monitoring burden and latency in reacting to node failures.

One such example involves the first node 410A having a primary replica of the user data 412 and the second node 410B having a secondary replica of the user data 412. If the system configuration data 404 specifies that the location of the primary replica is to be the second node 410B, and the location of the secondary replica is to be the first node 410A, contrary to the current state of the database system 100, the state machines 414A and 414B may modify a configuration of the first and second node 410A and 410B to change which of the nodes has the primary replica and which node has the secondary replica of the user data 412.

Modifying the configuration of the database system 100 in this case may involve providing the second node 410B with rights to perform transactions on the user data 412 stored thereon, and to cause the first node 410A to replicate the user data 412 from the second node 410B. Other operations may be performed when the location of a primary replica of the user data 412 is modified. The required changes to the configuration of the second set of nodes 406 may depend on the structure and arrangement of the second set of nodes 406 and the manner in which the database system 100 is configured to operate.

In this example, the first set of nodes 402 are responsible for centrally determining a desired configuration of the database system 100 which aims to ensure high availability of user data 412. In the event of new nodes being added to the operational nodes 406, nodes failing or going offline, and other changes in state that may disrupt the replication dependency between the operational nodes 406, the first set of nodes 402 can send configuration data to the operational nodes 406 to account for these changes. Democratizing the configuration and reconfiguration of the database system 100 by causing the second set of nodes 406 to arrange themselves in the desired configuration according to the system configuration data 404 may also make the system 100 more elastic and better suited to adding and removing new nodes. This is because the first set of nodes 402 are not tasked with actively coordinating the replication and/or other communication between the second set of nodes 406. Distributing the workload involved in managing new nodes reduces the likelihood that any one node will be overwhelmed by processing changes to the system configuration and or processing I/O requests from a plurality of other nodes in the system to coordinate the configuration.

As mentioned above, consensus-based replication protocols can require greater computational resources, for example, more nodes, for the same level of durability as certain synchronous replication protocols. While consensus-based replication protocols do provide higher data availability, this increased expense may make using consensus-based replication protocols for performing operations on user data 412 undesirable. Accordingly, the user data 412 may be replicated 318 by the second set of nodes 406 according to a non-consensus-based replication protocol. Using more agile, non-consensus-based, replication procedures for replication of user data 412, may increase the performance of the operational nodes 406 when operating on user data 412. This also makes the second set of nodes 406 more suited for handling highly transactional workloads that would be cumbersome to perform in an environment that relies on consensus-based replication protocols for handling user data 412.

In the configuration of some database systems 100 there can be significantly more of the second set of nodes 406 than the first set of nodes 402. As such providing operational nodes 406 that can process transaction requests and replicate in an agile nature is desirable as the likelihood, and frequency, of node failovers, or scale-out is much higher for the second set of nodes 406 than for the first set of nodes 402.

As mentioned above with respect to FIG. 4, the first set of nodes 402, comprise a master node 408A and two or more coordinator nodes 408B to 408D that are communicatively coupled to the master node 408A and configured to replicate the system configuration data 404 according to the consensus-based replication protocol. The two or more coordinator nodes 408A to 408D may also be referred to as voting members, or voting member nodes, indicating that they are entitled to a vote during a consensus-based replication protocol in which their vote represents whether they agree with a change to be made to the system configuration data 404, or not. The consensus-based replication protocol may specify that generating the system configuration data 404 is initiated by the master node 408A and that this generation of system configuration data 404 is dependent on a majority of the first set of nodes 402 agreeing with the master node 408A with respect to the system configuration data 404. In this way, changes to the system configuration data 404 are made when these changes can be stored durably in the database system 100, and these changes can be prevented when the durability of the changes to the system configuration data 404 cannot be guaranteed.

Figure 5:
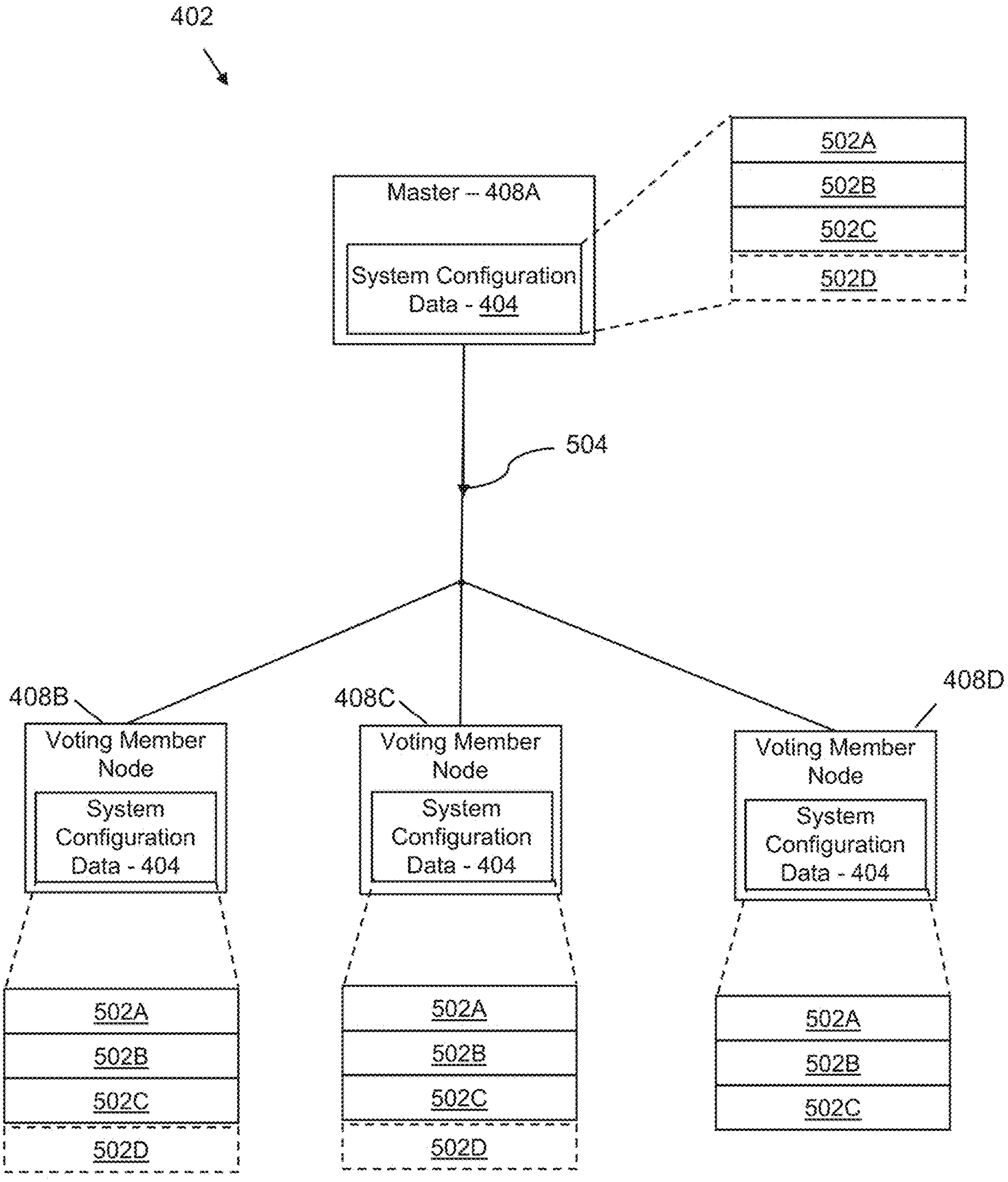
FIG. 5 is a schematic diagram showing a consensus-based replication protocol according to examples.

Turning to FIG. 5 an example of a consensus-based replication protocol is shown. In the example, generating the system configuration 404 includes the master node 408A generating a write request 504 to modify the system configuration data 404 based on the instantaneous state of the database system 100. In FIG. 5 it can be seen that the system configuration data 404 initially includes a set of entries or data entries 502A to 502C. These entries may specify certain properties relating to the configuration of the database system 100, such as where portions of user data 412 are stored and which nodes 410A to 410C store primary and secondary copies of the user data 412. These entries 502A to 502C may have been determined at a prior point in time, for example, during a previous operation to generate the system configuration data 404. The write request 504 to modify the system configuration data 404 may include an indication of a new entry 502D to be added to the system configuration data 404. Alternatively, or additionally, the write request 504 may indicate a modification to be made to a previous entry 502A to 502C.

The coordinator nodes 408B to 408D process the request 504 to replicate the write request from the master node 408A to the coordinator nodes 408B to 408D. The presence and absence of new entry 502D indicates that two of the coordinator nodes 408B and 408C have successfully processed the write request while the third coordinator node 408D has not successfully replicated the write request 504. This may be due to a delay in processing or some other failure, for example, a data error, a software issue, or a network failure when communicating with the third coordinator node 408D.

Depending on the outcome of processing the write request 504 using the coordinator nodes 408B to 408D, the step of generating the system configuration data 404 may proceed in one of two ways. If at least half of the coordinator nodes 408B to 408D successfully replicate the write request 504 from the master node 408A to the at least half of the coordinator nodes 408A to 408D, the system configuration data 404 is modified according to the write request 504. If at least half of the coordinator nodes 408B to 408D do not successfully replicate the write request 504 from the master node to the at least half of the coordinator nodes 408A to 408D, the system configuration data 404 is not modified according to the write request 504. Which is to say that the write request 504 is rejected. In this way, at least half of all of the first set of nodes 402, including the master node 408A, need to have a copy of the writes or modifications to be made for those changes to be completed. Withholding writes to the system configuration data 404 ensures that, in the event of a failover of, say, the master node 408A, a single version of the most up-to-date copy of the system configuration data 404 is known from at least half of the remaining coordinator nodes 408B to 408D.

As mentioned above, in some cases, any coordinator node(s) that has/have not replicated the write request 504 may be experiencing a delay, either in communication with the master node 408A, or in processing the write request 504 on the node(s). In this case, the node(s) may subsequently replicate the write request 504. For example, the write request 504 may be accepted by a majority of the first set of nodes 402 and subsequently accepted by any remaining nodes such as node 408D in this example.

In some consensus-based replication protocols, for example, consensus based replication protocols that are based on, or similar to, Raft protocols the coordinator nodes 408B to 408D, or voting member nodes, shown in FIG. 5 may be referred to as synchronous coordinator nodes, meaning that, at the time the request 504 to generate the system configuration data 404 is generated, these nodes comprise up-to-date copies of the current system configuration data 404 as stored on the master node 408A. For example, the synchronous coordinator nodes 408B to 408D include the data entries 502A to 502C representing a database system configuration. In some cases, synchronous coordinator nodes 408B to 408D may additionally have an active, or confirmed, communication channel with the master node 408A to receive write requests 504. The first set of nodes 402 may additionally include one or more asynchronous coordinator nodes storing a replica of the system configuration data 404 that is out of synchronization with the replicas of the system configuration data 404 stored on the synchronous coordinator nodes 408B to 408D. In some examples, these asynchronous coordinator nodes are nodes that, in addition to not having a synchronous copy of the system configuration data 404, also have a communication failure with the first set of nodes 402 and so are not currently able to contribute to voting.

Figure 6:
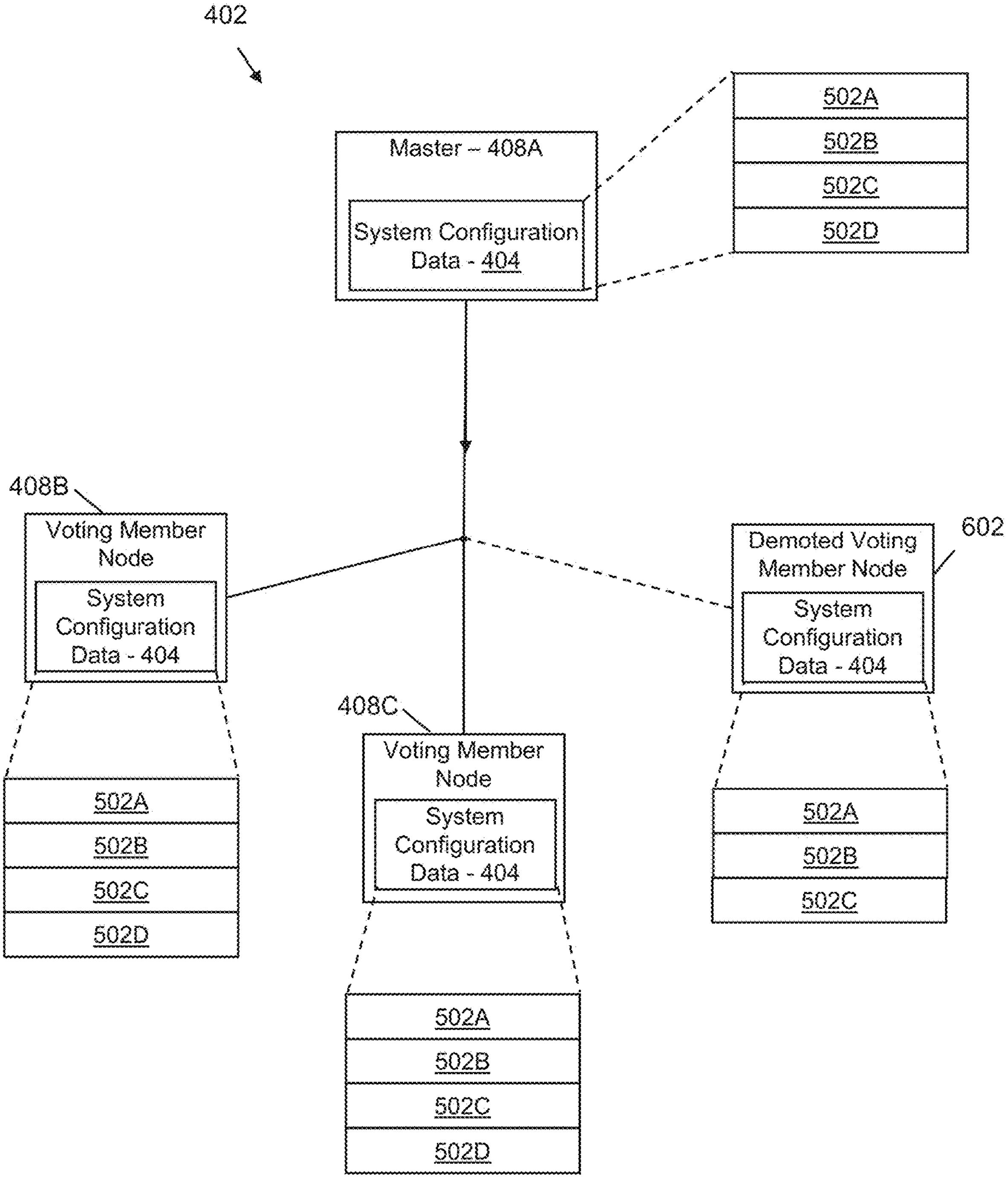
FIG. 6 is a schematic diagram showing synchronous and asynchronous coordinator nodes according to examples.

FIG. 6 shows the first set of nodes 402 at a time after the example shown in FIG. 5, and at which the node 408D, that was unsuccessful in replicating the write request 504, has become an asynchronous coordinator node 602. It can be seen here that the synchronous coordinator nodes 408B to 408C each store a contemporary copy of the system configuration data 404 that matches the system configuration data 404 stored on the master node 408A. The asynchronous coordinator node 602 does not have a contemporary replica of the system configuration data 404, since in this example it is missing the last data entry 502D. Coordinator nodes 408B to 408D can fall out of synchronization with the other coordinator nodes for a number of reasons. For example, due to data corruption, network connection loses, or temporary resource reallocation, a coordinator node 408D can fail to successfully process and record one or more write requests 504 generated by the master node 408A. In some cases, a coordinator node 408D that falls out of synchronization may quickly be brought back into sync with the remaining nodes 408A to 408C. However, in some instances they may remain asynchronous for an extended period of time. In the event that a synchronous coordinator node 408D loses synchronization with the remaining coordinator nodes 408B and 408C, for example as is shown in FIG. 5 in which the last node 408D fails to process the write request 504 and fails to regain synchronization it may no longer be afforded a vote in subsequent consensus-based replication procedures. Removing the rights for a coordinator node 408D to vote may be initiated by the master node 408A, and may involve modifying the number of nodes 402 needed to reach a majority for consensus. This procedure may be performed when a coordinator node has been asynchronous for a predetermined period of time and/or where the coordinator node is no longer in communication with some or all of the remaining coordinator nodes 408A to 408C This allows the consensus-based replication process to proceed without significant delays in the event that one or more coordinator nodes 408B to 408D loses the ability to communicate or vote with the remaining coordinator nodes 408B to 408D.

The system configuration data 404 may be sent to both synchronous coordinator nodes 408B and 408C and to asynchronous coordinator nodes 408D to enable to the asynchronous coordinator nodes 408D to catch up to the synchronous coordinator nodes 408B and 408C. In examples where voting rights are removed from asynchronous coordinator nodes the first set of nodes 402 may additionally be configured to monitor a synchronization state of the one or more asynchronous coordinator nodes 602. If a given asynchronous coordinator node 602 obtains synchronization with the synchronous coordinator node 408B to 408C, determined in the monitoring, then the asynchronous coordinator node 602 may become a synchronous coordinator node and provided with a vote in subsequent consensus-based replication procedures. One or more additional replication procedures may be performed amongst the first set of nodes 402 to bring asynchronous nodes 602 back into synchronization. This may involve performing a snapshot recovery or other non-consensus-based replication protocol. This replication procedure may be based on data from one of the synchronous coordinator nodes 408B to 408C and/or the master node 408A.

In this way, if a coordinator node such as node 408D shown in FIG. 5 drops out of synchronization, it can be brought back into synchronization with the coordinator node group 408B to 408C. Consensus-based replication protocols rely on minimum numbers of nodes being able to vote for consensus on new system configuration data 404 writes. Therefore, being able to maintain the voting member nodes allows a minimum number of voting members to be maintained amongst the coordinator nodes 408B to 408D. In some cases, for example due to a network failure, a situation may arise in which there are not sufficient voting members in communication with the master node 408A available to hold a meaningful vote for consensus purposes. In these circumstances, the master node 408A may continue to record transactions, or changes, to the system configuration 404 though they will not be completed until a sufficient number of voting members come back online.

Other consensus-based replication protocols, such as those based on, or similar to, Paxos may proceed differently. In particular, it may not be necessary in Paxos for each coordinator node to have a synchronous copy of all of the system configuration data 404 provided that each write request 504 is acknowledged by a majority of the nodes.

Election of a master node may proceed according to an election procedure in which the master node is elected by the first set of nodes 402. The master node may initially be a coordinator node and may be elected to be the master by agreement amongst the first set of nodes 402. If the master node fails, a new master can be elected by the remaining first set of nodes 402. If a failure condition, associated with the master node, is detected, the two or more coordinator nodes are configured to elect a coordinator node to be the new master node.

There are a number of different types of election procedures which may be performed by the first set of nodes 402 to elect a new master node. In some cases, the election may include identifying which of the coordinator nodes are synchronous coordinator nodes, and then selecting a node from the synchronous coordinator nodes. The selection of a node from the synchronous coordinator nodes may be based on available resources for each of the synchronous nodes. As described above, the master node may perform functions beyond that of the others of the first set of nodes 402, such as determining the instantaneous state of the database, initiating write requests 504 for generating the system configuration data 404, and others. So, selecting a node that has the largest available resources may be desired. In some examples, the election may be performed based on a simple or absolute majority. In some cases, the voting member nodes may be restricted to electing a coordinator node from a subset of the total available coordinator nodes.

Applying this to the example shown in FIG. 4, the master node 408A is a coordinator node that has been elected by a majority of the coordinator nodes 408A to 408D. If a failure condition, associated with the master node 408A, is detected, the remaining coordinator nodes 408B to 408D will elect one of the remaining coordinator nodes 408B to be the new master node. The coordinator node 408B elected to be the new master node is a synchronous coordinator node, meaning that it has a contemporary copy of the system configuration 404 and as such can continue the operations of the previous master node 408A without disruption. Failure conditions may include failure in communications between the master node 408A and the remaining coordinator nodes 408B to 408D and/or the second set of nodes 402. Alternatively, or additionally, failure conditions may include a failure, or data error, in the master node 408A.

Figure 7:
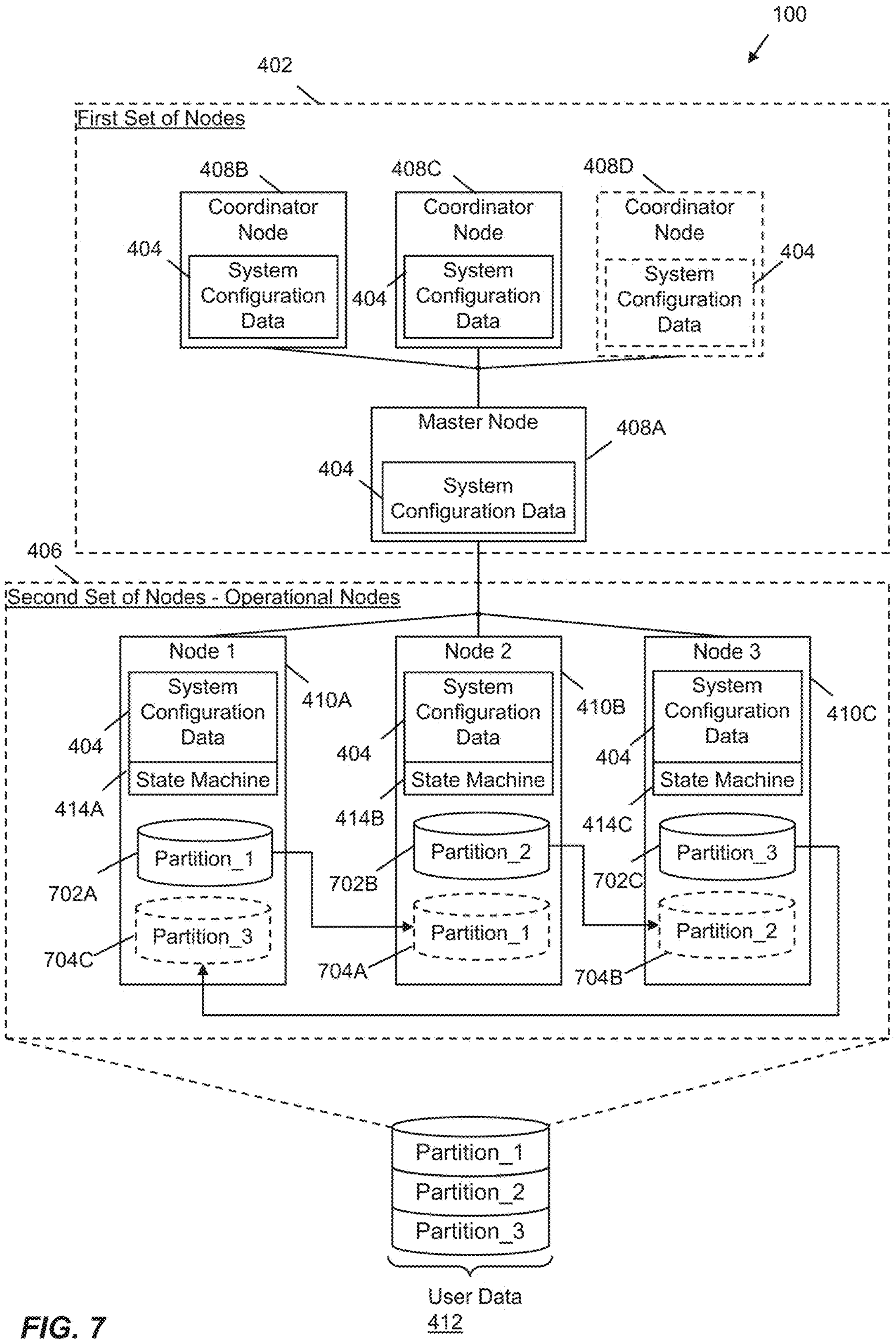
FIG. 7 is a schematic diagram showing a database system comprising a first of nodes and a second set of nodes and in which the user data is segmented into a plurality of partitions.

In the examples described above with respect to FIG. 4 to FIG. 6, the user data 412 is shown as being a single block of data stored on the nodes 410A to 410C. The user data 412 may alternatively be segmented into two or more partitions to increase the elasticity of storage and/or compute, which is to say the ability to scale out the database system 100 allowing additional resources to be used for storing data and/or executing queries, or other transactions, against the data stored therein. Turning to FIG. 7, an example is shown in which the user data 412 is separated into three partitions, each partition including a portion of the whole user data 412. The primary replicas 702A to 702C of these partitions are each stored on a different node 410A to 410C of the second set of nodes 406. The secondary replicas 704A to 704C of the partitions are also distributed across the second set of nodes 410A to 410C. The secondary replicas 704A to 704C may be stored on a different one of the second set of nodes 406 than their respective primary replica 702A to 702C. Distributing the user data 412 across the second set of nodes 402 by partitioning the data provides better availability in the event of a failover of any one of the second set of nodes 410A to 410C.

Where the database system 100 is configured to partition the user data 412 as shown in FIG. 7, certain modifications are made to the method 300. In particular, determining an instantaneous state of the database system 100 may include determining the location of primary and secondary replicas for each of the partitions in the database system 100. For example, where the user data is segmented into two or more partitions, each partition having a primary replica and a secondary replica, the indication of which of the second set of nodes 406 includes the primary and/or secondary replica of the user data 412 may be provided for each partition. Additionally, or alternatively, the synchronization state of the secondary replica of the user data 412 may be provided for each partition. In this way, granular detail of the precise state of each of the primary and secondary replicas of the partitions of the user data 412 can be determined and used when generating the system configuration data 404.

Figure 8:
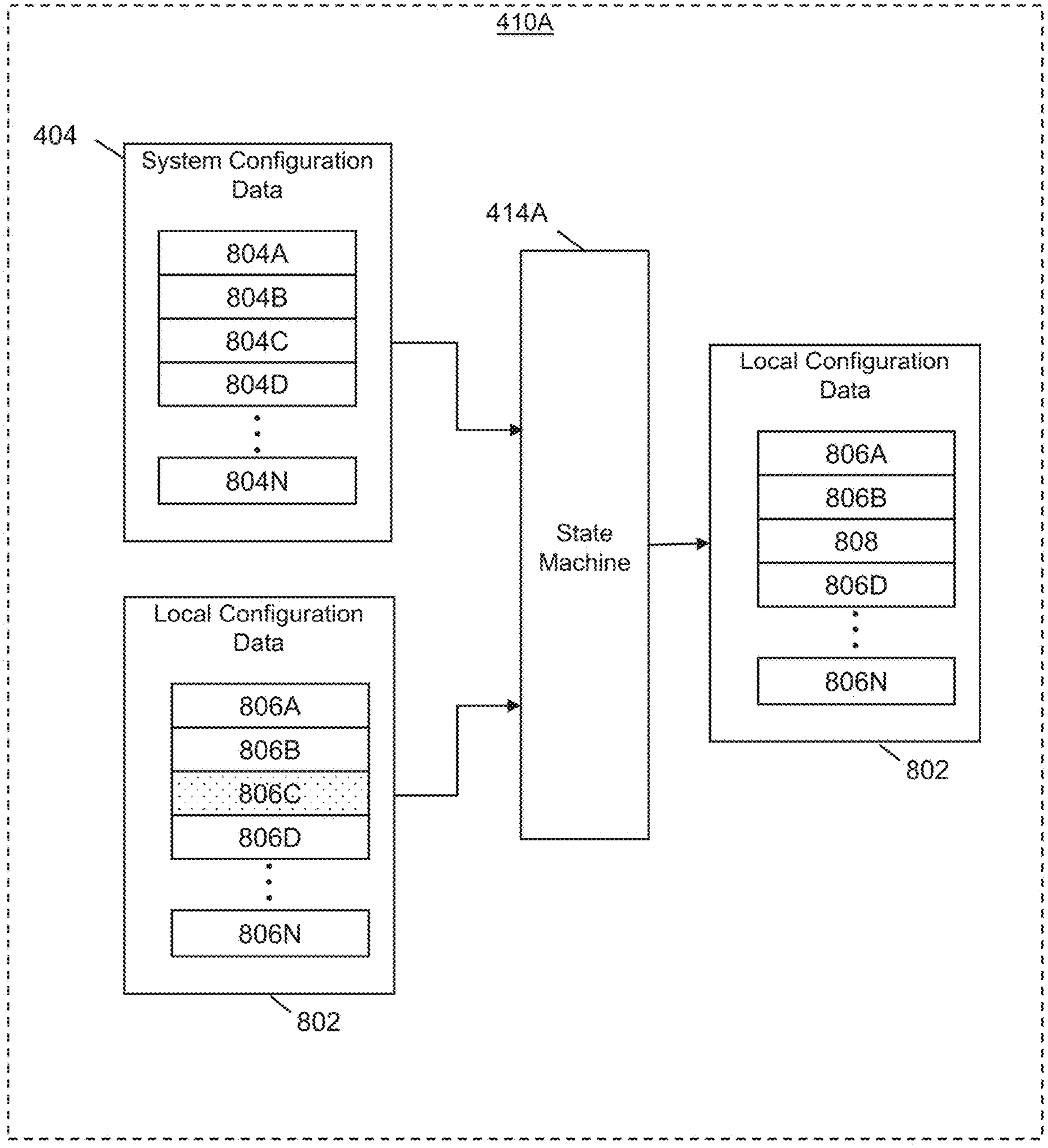
FIG. 8 is a schematic diagram showing the functions of a state machine according to examples.

FIG. 8 shows an operation of the state machine 414A according to examples. The operational nodes 410A may store local configuration data 802 representing a configuration of the second set of nodes. This local configuration data may represent, an identifier for the respective nodes, a role for the node 410A, which may include any replication or management functions for which the node 410A is responsible, a synchronization state of any replicas stored on the node 410A, an indication of log sequence number (or "LSN"), representing the most recent transaction having been performed, an indication of a previous failure, and so forth. In some examples, each of the nodes 410A may include local configuration data 802 that is representative of information relating to that specific node 410A. In other examples, the local configuration data 802 stored on the node 410A may be representative of configuration for a group of one or more nodes in the second set of nodes 406.

The state machine 414A may be configured to process the system configuration data 404, received from the first set of nodes 402, to identify one or more differences between the local configuration data 802 and the system configuration data 404. For example, the system configuration data 404 may include a plurality of data entries 804A to 804N representing a target configuration of the database system 100. The local configuration data 802 may include a plurality of entries 806A to 806N representing the local configuration relevant to the node 410A. The state machine 414A may process the system configuration data 404 and the local configuration data 802 and identify that a characteristic of the local configuration, as specified by a particular data entry 806C, is in conflict with, or differs to, a corresponding entry 804C in the system configuration data 404. For example, the data entry 806C in the local configuration data 802 may specify that a partition 702A is to be replicated to a first node 410B, whereas data entry 804C in the system configuration data 404 may specify that the partition 702A is to be replicated to a second, different, node 410C.

The state machine 414A may modify the local configuration data 802 according to the one or more differences. In this case, the data entry 806C may be modified to generate a new data entry 808 in the local configuration data 802 that does not conflict with characteristics represented by the corresponding entry 804C in the system configuration data 404. Modifying the local configuration data 802, and particularly the first data entry 804C, may include overwriting one or more data values. Alternatively, one or more portions 806C of the local configuration data 802 may be deleted and new portions of data 808 may be generated based on the system configuration data 404, and in particular the data entry 804C. The local configuration data 802 may be used by the second set of nodes 406 when performing operations, replication, and other functions with respect to the user data 412. Certain management functions that are performed by the second set of nodes 406 may, for instance, refer to the local configuration data 802 when determining how to proceed.

Figure 9:
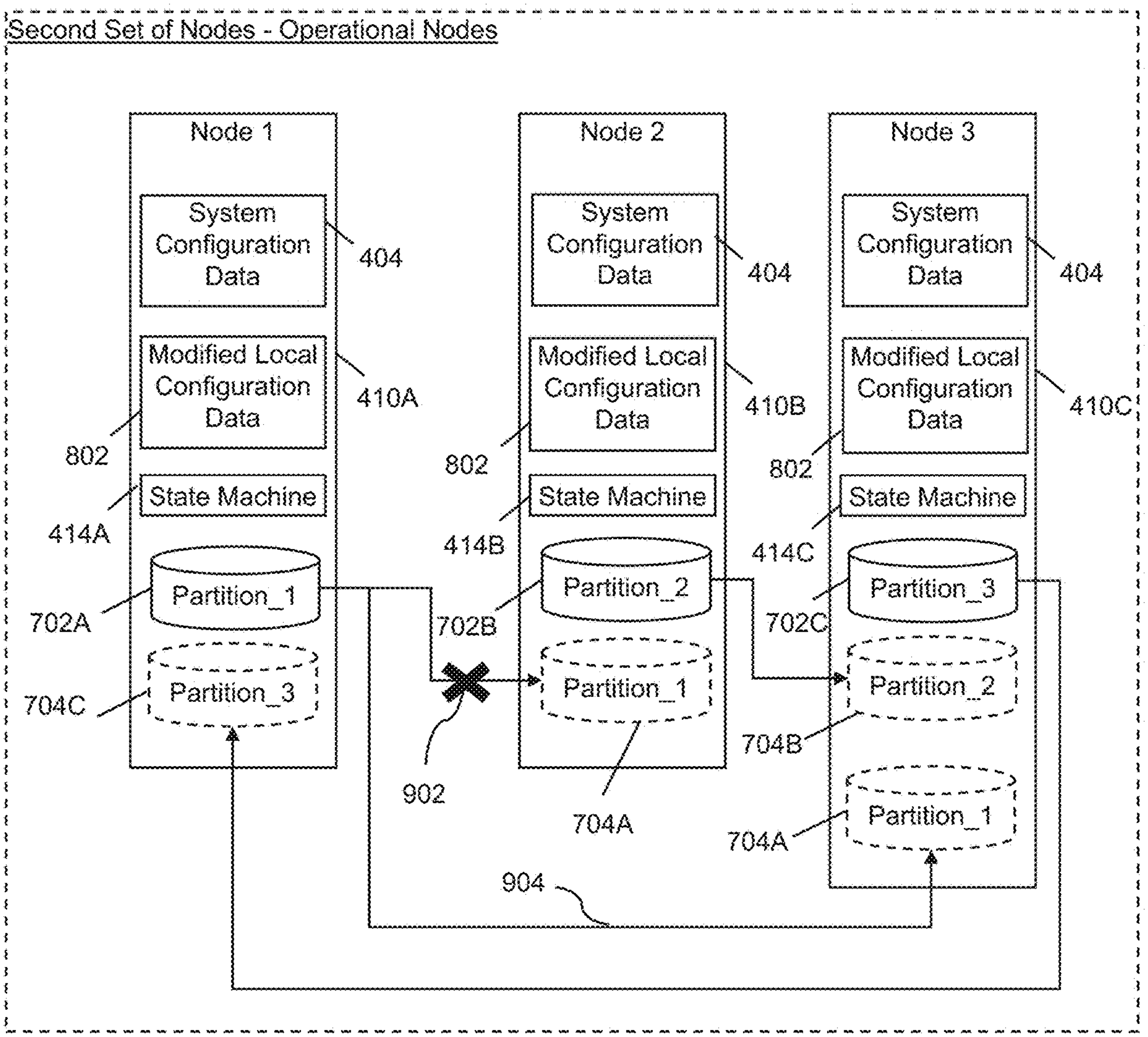
FIG. 9 is a schematic diagram showing a predetermined action taken by the second set of nodes in response to a change in local configuration data according to examples.

Modifying the local configuration data 802 may cause the second set of nodes 406 to perform a predetermined action. FIG. 9 shows an example in which a partition 704A stored on a node 410B has either gone offline, shown by a failure 902 in communication with the partition 704A, meaning it is not currently replicating the primary replica 702A, and/or may be in an asynchronous state meaning that it is not up-to-date with the latest changes to the primary replica 702A. The first set of nodes 402, and preferably the master node 408A, detect this change in the state of the secondary replica 704A and the system configuration data 404 is provided to the second set of nodes 406 to enable the nodes 406 to reconfigure themselves to account for this failure 902. The state machines 414A to 414C may modify the local configuration data 802 according to the system configuration data 404 to specify one or more changes to be made to the configuration. This may cause a first node 410A of the second set of nodes 406 to replicate 904 the user data 702A to a second node 410C in the second set of nodes 406. In this case, this means generating a secondary replica 704A of the first partition 702A to a new node 410C when the previously designated secondary replica is no longer replicating the primary replica.

In some instances, a primary replica 702A may have an error, or a node 410A storing the primary replica 702A may crash. In this case the predetermined action may include selecting a given node 410C to store a primary replica of the user data 702A, for example, by converting a secondary replica 704A of the same portion of user data to be a primary replica 702A.

Aside from failovers or synchronization errors, other changes to the state may cause user data 412 to be moved or replicated amongst the second set of nodes 406. For example, when a new node is to be added to the second set of nodes 406, system configuration data 404 that specifies what the role of the new node is to be, what data it is to store, and whether it is responsible for primary replicas, secondary replicas, or a combination of replica types for the user data 412, is generated by the first set of nodes 402. The first set of nodes 402 distribute this system configuration data 404 to the second set of nodes 406, including the new node, such that they can modify their local configuration data 802 to conform with the configuration specified in this new system configuration data 404. In doing so, the second set of nodes 406 may initiate a number of replication procedures to bring the local configuration into conformity with the configuration specified by the system configuration data 404. These replication procedures may include replicating user data 412 to the new node.

Another example includes when a new partition of user data 412 is to be added or generated from a previous partition 702A. This may be initiated by the master node 408A, for example, where the master node 408A determines that a redistribution of user data 412 amongst the second set of nodes 406 is needed to increase the availability, or durability of the user data 412. Alternatively, or additionally, the master node 408A may initiate such a redistribution when some portions of the user data 412 need to be distributed to nodes of the second set of nodes 406 that have more computational capacity for performing operations on the data 412 in order to handle a workload instructed by a user. Users of the system 100 may also initiate such configuration changes by providing instructions to the master node 408A, for example, via the communication modules 106. When adding a new partition, the first set of nodes 402 may generate system configuration data 404 that specifies where the new partition is to be stored, including its respective primary and secondary replica. The system configuration data 404 is provided to the second set of nodes 406. The second set of nodes 406 may then modify their local configuration based on the system configuration data 404, which in this example involves generating a new partition, including a primary and secondary replica. One or more of the second set of nodes 406 may then replicate relevant portions of data 412 to other nodes of the second set of nodes 406 to populate the primary and secondary replica of this new partition. Similar procedures may also be carried out when a partition is to be deleted or combined with one or more other partitions.

In some examples, a previous change in the system configuration data 404, for example based on a change in the instantaneous state of the system 100, can trigger the first set of nodes 402 to make further changes to the system configuration data 404. For example, if a first node 410A, storing a primary replica 702A of a partition fails, a secondary replica 704A of that partition stored on a second node 401B may be converted to a primary replica. In this example, the second node 410B may then be storing two primary replicas of different partitions 702B and 704A. In this example, the system configuration data 404 may subsequently be modified to specify that at least one of the replicas 702B to 704A stored on that node 410B should be converted to a secondary replica, and the primary replica should be stored on a different node 410C. Storing multiple primary replicas of user data 412 on a single node may be undesirable due to the higher risk of downtime in the case that said node 410B fails. So balancing the distribution of primary and secondary replicas of user data 412 across the second set of nodes 406 may be performed using the system configuration data 404.

Figure 10:
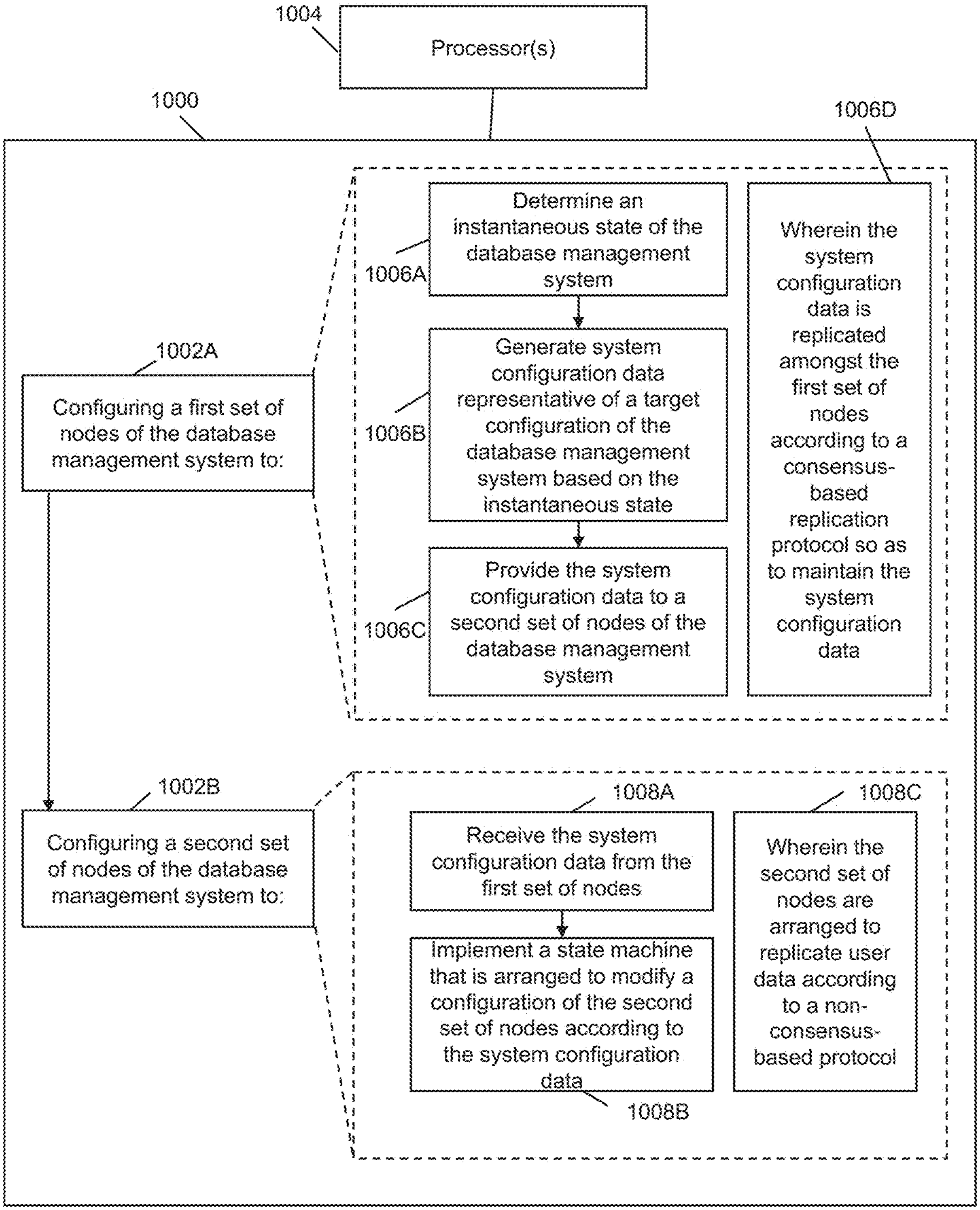
FIG. 10 is schematic diagram showing a non-transitory computer-readable storage medium according to examples.

FIG. 10 shows a non-transitory computer-readable storage medium 1000 comprising computer-executable instructions 1002A and 1002B which, when executed by one or more processors 1004, cause the one or more processors 1004 to perform the method 300. A first instruction block 1002A, when executed, causes the processor(s) 1004 to configure the first set of nodes 402 of the database management system to determine 1006A an instantaneous state of the database management system 100, generate 1006B system configuration data 404 representative of a target configuration of the database management system 100 and provide 1006C the system configuration data 404 to the second set of nodes 406. The first set of nodes 402, as described above with reference to FIG. 3 to FIG. 9, are replicated 1006D the system configuration data 404 amongst the first set of nodes 402 according to a consensus-based replication protocol.

A second instruction block 1002B, when executed, causes the processor(s) 1004 to configure the second set of nodes 406 of the database management system 100 to receive the system configuration data 404, and implement a state machine 414A that is arranged to modify a configuration of the second set of nodes 406 according to the system configuration data 404. The second set of nodes 406 are arranged to replicate 1008C user data 412 according to a non-consensus-based protocol. It will be appreciated that any additional features or examples described above in relation to FIG. 2 to FIG. 9 are also applicable to the implementation shown in FIG. 10.

The above examples are to be understood as illustrative. Further modifications and features may also be implemented according to the present disclosure. For example, one or more of the first set of nodes 402 may also be configured to process user data 412, for example by being included in the second set of nodes 406. The consensus-based protocols, for replication and/or election of new master nodes, may implement a timeout function for voting members such that a voting member must respond to a request within a predetermined period of time. Voting members which are not able to reply within the consensus timeout period may have the rights to vote in consensus-based replication protocols removed until they have obtained synchronization with the remaining voting members.

Additionally, in the examples described herein, the database system 100 implements a single cluster configured to operate on user data 412 that may or may not be partitioned. It is to be appreciated that the examples described herein may also be applicable to database systems 100 operating multiple clusters of nodes, each cluster being responsible for managing and processing respective user data 412. In the case where a plurality of clusters is provided by the database management system 100 a single first set of nodes 402 may be used to manage the configuration of each of the clusters, and in some cases to coordinate between the clusters. Alternatively, the database management system 100 may implement separate first sets of nodes 402 for each cluster.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method for operating a database management system comprising a first set of nodes for maintaining system configuration data and a second set of nodes for storing user data, the second set of nodes being separate from the first set of nodes, the method comprising:

- configuring the first set of nodes of the database management system to:
  - determine an instantaneous state of the database management system;
  - in response to determining the instantaneous state, generate system configuration data using a consensus-based replication protocol to maintain the system configuration data in the first set of nodes by:
    - writing an indication of a target configuration of the second set of nodes to system configuration data; and
    - replicating the system configuration data amongst the first set of nodes using the consensus-based replication protocol; and
  - provide the system configuration data to the second set of nodes of the database management system; and
- configuring the second set of nodes to:
  - store local configuration data representing the configuration of the second set of nodes;
  - receive the system configuration data from the first set of nodes; and
  - implement a state machine that is arranged to modify a configuration of the second set of nodes according to the system configuration data by:
    - processing the system configuration data using the state machine to identify one or more differences between the local configuration data and the system configuration data; and
    - modifying the local configuration data according to the one or more differences,
  - wherein the second set of nodes are arranged to replicate user data according to a non-consensus-based replication protocol by which a first node of the second set of nodes can commit a transaction on user data prior to replicating the committed transaction to a second node of the second set of nodes.

2. The computer-implemented method according to claim 1, wherein each node of the second set of nodes implements a respective state machine that is arranged to modify the configuration of a respective node of the second set of nodes according to the system configuration data.

3. The computer-implemented method according to claim 1, wherein the second set of nodes comprises the first node on which a primary replica of the user data is stored and the second node on which a secondary replica of the user data is stored, wherein the instantaneous state of the database management system is a change in communication state of the first node of the second set of nodes, and wherein the target configuration comprises:

- a selection of the second node of the second set of nodes to store the primary replica of the user data; and
- a demotion of the first node of the second set of nodes to storing the secondary replica of the user data.

4. The computer-implemented method according to claim 3, wherein the change in communication state of the first node of the second set of nodes comprises a change in latency of communication with the first node of the second set of nodes.

5. The computer-implemented method according to claim 3, wherein the change in communication state of the first node of the second set of nodes comprises a failure in communication of the first node of the second set of nodes.

6. The computer-implemented method according to claim 1, wherein the second set of nodes comprise the first node on which a primary replica of the user data is stored, the second node on which a secondary replica of the user data is stored, and a third node on which the user data is not stored, wherein the instantaneous state of the database management system is a change in communication state of the second node of the second set of nodes, and wherein the target configuration comprises:

- a selection of the third node of the second set of nodes to store the primary replica of the user data; and
- a demotion of the second node of the second set of nodes to not storing the secondary replica of the user data.

7. The computer-implemented method according to claim 6, wherein the change in communication state of the second node of the second set of nodes comprises a change in latency of communication with the second node of the second set of nodes.

8. The computer-implemented method according to claim 6, wherein the change in communication state of the second node of the second set of nodes comprises a change in a synchronization state of the secondary replica stored on the second node.

9. The computer-implemented method according to claim 6, wherein the change in communication state of the second node of the second set of nodes comprises a failure in communication of the second node of the second set of nodes.

10. The computer-implemented method according to claim 1, wherein the second set of nodes comprises the first node on which a primary replica of the user data is stored, the second node on which a secondary replica of the user data is stored, and a third node on which the user data is not stored, and wherein configuring the first set of nodes of the database management system to determine the instantaneous state of the database management system comprises configuring the first set of nodes to:

- receive a request to implement a workload, the workload comprising a plurality of operations to be performed on the user data;
- determine that a computational capacity of the first node is insufficient for performing the plurality of operations; and
- determine that a computational capacity of the third node is sufficient for performing the plurality of operations, and
- wherein the target configuration comprises:
  - a selection of the third node to store the primary replica of the user data for implementing the workload; and
  - a demotion of the first node to not storing the primary replica of the user data.

11. The computer-implemented method of claim 1, wherein the second set of nodes comprises the first node on which a primary replica of the user data is stored and the second node on which a secondary replica of the user data is stored, wherein configuring the first set of nodes of the database management system to determine the instantaneous state of the database management system comprises configuring the first set of nodes to receive a request to add a third node to the second set of nodes, and wherein the target configuration comprises a selection of the third node of the second set of nodes to store:

the primary replica of the user data;

the secondary replica of the user data; or an additional secondary replica of the user data.

12. The computer-implemented method of claim 1, wherein second set of nodes comprises the first node on which a primary replica of a first partition of the user data is stored, the second node on which a secondary replica of the first partition of the user data is stored, wherein configuring the first set of nodes of the database management system to determine the instantaneous state comprises configuring the first set of nodes to receive a request to generate a second partition of the user data, and wherein the target configuration comprises:

a selection of a node of the second set of nodes to store a primary replica of the second partition of the user data; and a selection of a different node of the second set of nodes to store a secondary replica of the second partition of the user data.

13. The computer-implemented method for operating a database management system according to claim 1, wherein the first set of nodes comprises a master node, configured to generate the system configuration data, and two or more coordinator nodes configured to replicate the system configuration data according to the consensus-based replication protocol, and wherein generating the system configuration data includes:

the master node generating a write request to modify the system configuration data based on the instantaneous state;

processing the request using two or more coordinator nodes to replicate the write request from the master node to the two or more coordinator nodes; and at least one of:

if at least half of the coordinator nodes successfully replicate the write request from the master node to the at least half of the coordinator nodes, modifying the system configuration data according to the write request; or if at least half of the coordinator nodes do not successfully replicate the write request from the master node to the at least half of the coordinator nodes, rejecting the write request.

14. The computer-implemented method for operating a database management system according to claim 13, wherein the coordinator nodes are synchronous coordinator nodes and the first set of nodes further comprises one or more asynchronous coordinator nodes each storing a replica of the system configuration data, and for which their respective replica is out of synchronization with replicas of the system configuration data stored in the two or more synchronous coordinator nodes and wherein the first set of nodes are configured to:

monitor a synchronization state of the one or more asynchronous coordinator nodes; and if a given asynchronous coordinator node obtains synchronization with the synchronous coordinator nodes, promote the given asynchronous coordinator node to be a synchronous coordinator node.

15. The computer-implemented method for operating a database management system according to claim 1, wherein the user data is stored in the database management system as a primary replica and a secondary replica, wherein operations to be performed on the user data are performed on the primary replica and subsequently replicated to the secondary replica, and wherein configuring the first set of nodes of the database management system to determine the instantaneous state of the database management system includes configuring the first set of nodes to receive state information from one or more of the second set of nodes, wherein the state information includes at least one of the following:

an indication of which of the second set of nodes includes the primary replica of the user data;

an indication of which of the second set of nodes includes the secondary replica of the user data;

for the nodes of the second set of nodes that include the secondary replica of the user data, a synchronization state for the secondary replica of the user data; and an indication of which of the second set of nodes are currently in communication with at least one other node of the second set of nodes.

16. The computer-implemented method for operating a database management system according to claim 15, wherein the user data is segmented into two or more partitions, each partition having a primary replica and a secondary replica, and wherein:

the indication of which of the second set of nodes includes the primary replica of the user data is provided for each partition;

the indication of which of the second set of nodes includes the secondary replica of the user data is provided for each partition; and the synchronization state of the secondary replica of the user data is provided for each partition.

17. The computer-implemented method for operating a database management system according to claim 1, wherein modifying the local configuration data according to the one or more differences causes the second set of nodes to perform a predetermined action, the predetermined action including at least one of the following:

causing a first node in the second set of nodes to replicate the user data to a second node in the second set of nodes; or selecting a given node of the second set of nodes to store a primary replica of the user data.

18. A database management system comprising:

a first set of nodes for maintaining system configuration data;

a second set of nodes for storing user data, the second nodes being separate from the first set of nodes;

at least one processor; and at least one memory, the memory including computer-executable instructions that, when executed by the at least one processor, cause the processor to:

configure the first set of nodes of the database management system to:

determine an instantaneous state of the database management system;

in response to determining the instantaneous state, generate system configuration data using a consensus-based replication protocol to maintain the system configuration data in the first set of nodes by:

writing an indication of a target configuration of the second set of nodes to system configuration data; and replicating the system configuration data amongst the first set of nodes using the consensus-based replication protocol; and provide the system configuration data to the second set of nodes of the database management system; and configure the second set of nodes to:

store local configuration data representing the configuration of the second set of nodes;

receive the system configuration data from the first set of nodes; and implement a state machine that is arranged to modify a configuration of the second set of nodes according to the system configuration data by:

processing the system configuration data using the state machine to identify one or more differences between the local configuration data and the system configuration data; and modifying the local configuration data according to the one or more differences, wherein the second set of nodes are arranged to replicate user data according to a non-consensus-based replication protocol by which a first node of the second set of nodes can commit a transaction on user data prior to replicating the committed transaction to a second node of the second set of nodes.

19. A non-transitory computer-readable storage medium comprising computer-executable instructions that, when executed by at least one processor, cause the at least one processor to:

configure a first set of nodes for maintaining system configuration data of the database management system to:

determine an instantaneous state of the database management system;

in response to determining the instantaneous state, generate system configuration data using a consensus-based replication protocol to maintain the system configuration data in the first set of nodes by:

writing an indication of a target configuration of a second set of nodes to system configuration data, the second set of nodes storing user data and being separate from the first set of nodes; and replicating the system configuration data amongst the first set of nodes using the consensus-based replication protocol; and provide the system configuration data to the second set of nodes of the database management system; and configure the second set of nodes to:

store local configuration data representing the configuration of the second set of nodes;

receive the system configuration data from the first set of nodes; and implement a state machine that is arranged to modify a configuration of the second set of nodes according to the system configuration data by:

processing the system configuration data using the state machine to identify one or more differences between the local configuration data and the system configuration data; and modifying the local configuration data according to the one or more differences, wherein the second set of nodes are arranged to replicate user data according to a non-consensus-based replication protocol by which a first node of the second set of nodes can commit a transaction on user data prior to replicating the committed transaction to a second node of the second set of nodes.

* * * * *